3 Sheets. Sheet 1.
W. N. Whiteley, Mower.
No. 1615
Reissued Feb. 2. 1864.
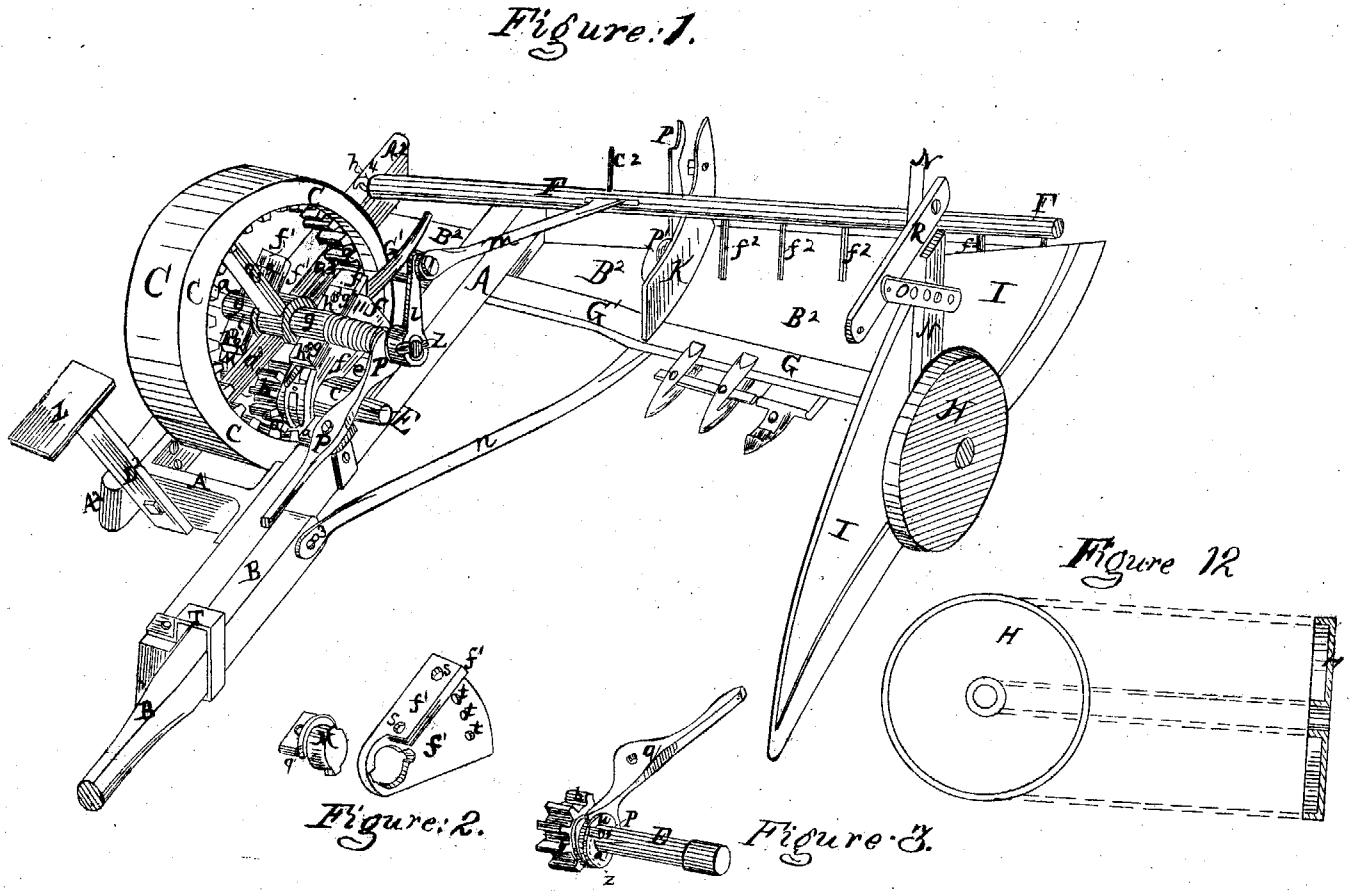
Witnesses
J. Dennis Jr.
J. E. Dennis
Wm N Whiteley Jr 3 Sheets. Sheet 2.
W. N. Whiteley,
Mower.
No. 1615 Reissued Feb. 2. 1864.
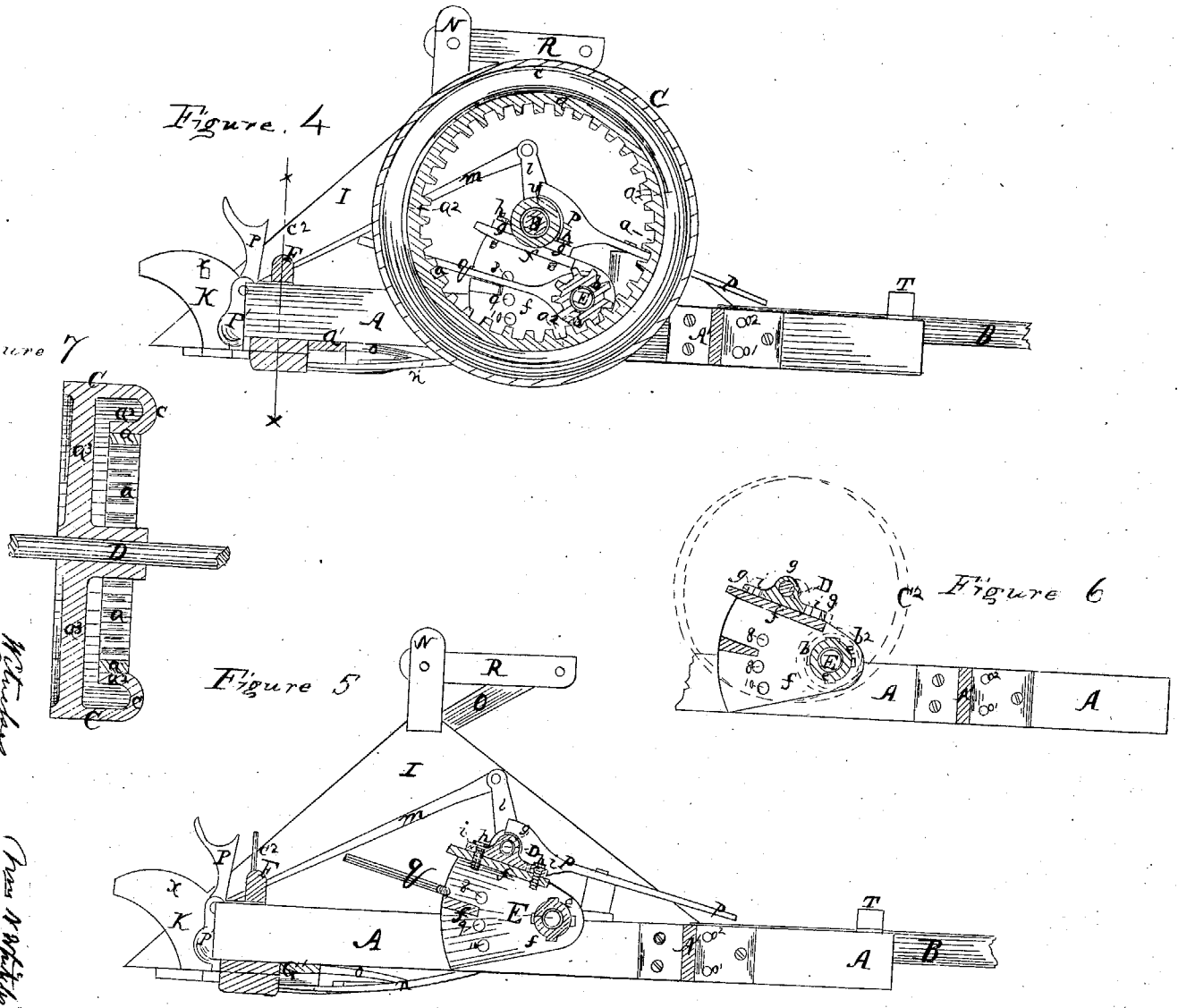
Witnesses
J. Dennis Jr
J. E. Dennis
Wm N Whiteley Jr 3 Sheets. Sheet 3.
W. N. Whiteley.
Mower.
No. 1615
Reissued. Feb. 2. 1864
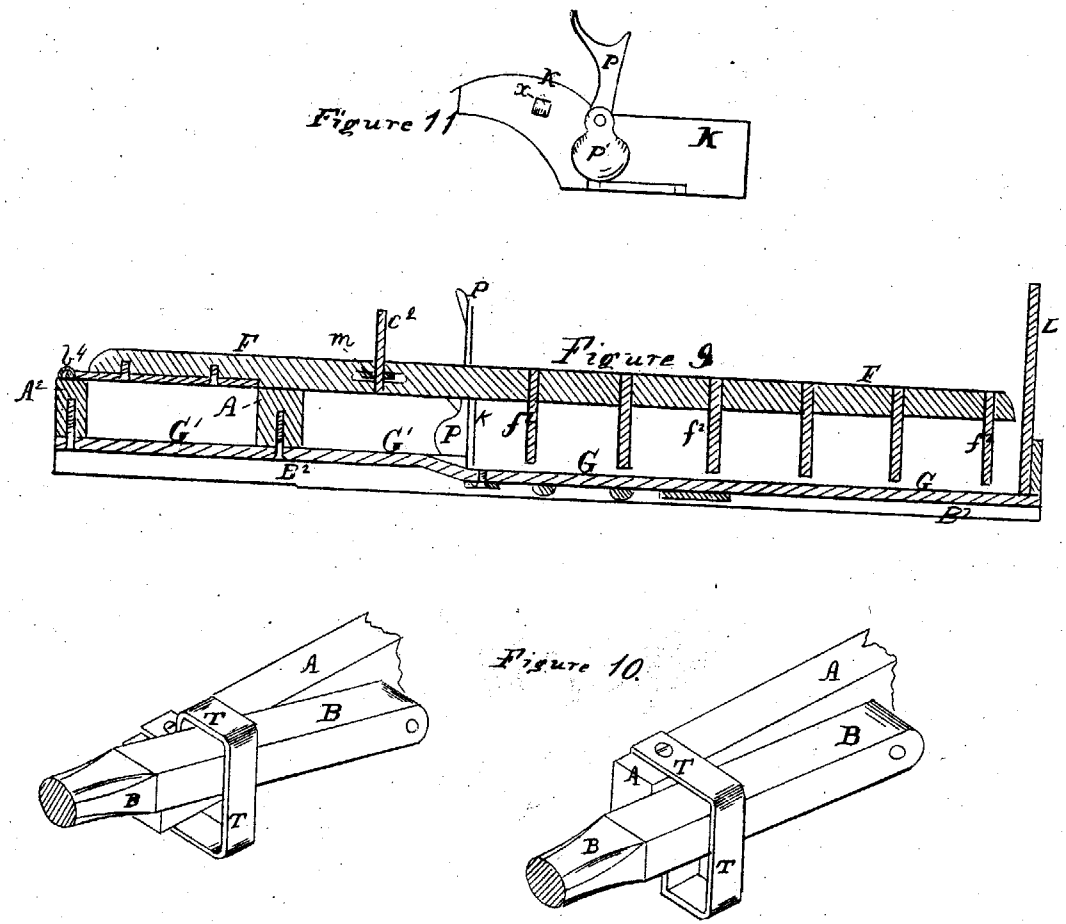
Witnesses
J. Dennis Jr.
J. E. Dennis
Wm. N. Whiteley pr

UNITED STATES PATENT OFFICE.

WILLIAM N. WHITELEY, JR., OF SPRINGFIELD, OHIO.

IMPROVEMENT IN HARVESTING-MACHINES.

Specification forming part of Letters Patent No. 16,131, dated November 25, 1856; Reissue No. 1,203, dated June 25, 1861; Reissue No. 1,615, dated February 2, 1864.

DIVISION B.

*To all whom it may concern:*

Be it known that I, WILLIAM N. WHITELEY, Jr., of Springfield, in the county of Clarke and State of Ohio, have invented certain new and useful Improvements in Harvesting-Machines; and I do hereby declare that the same are described and represented in the following specification and drawings.

The nature of my invention and improvements in harvesting-machines consists in providing an automatic rake which has its outer end move faster over the platform than its inner, with suitable mechanism to enable the driver, on his seat, to lock the crank which drives the rake to its shaft or release it therefrom, so as to rake the platform more or less often and make the gavels of a proper size for binding into sheaves where the grain is thin on the ground.

To enable other skilled in the art to make and use my improvements claimed in this patent, I will proceed to describe them, referring by figures and letters to the accompanying drawings, in which the same letters indicate like parts in each of the figures.

Figure 1 is a perspective view of a harvesting-machine with my improvements. Fig. 2 is a perspective view of one of the sector-plates (each of which carries an adjustable box in which the axle of the main ground and driving wheel turns) and its center stud or bearing detached. Fig. 3 is a perspective view of the pinion-shaft, pinions, clutch-pin, and shipper. Fig. 4 is a vertical section through the center of the driving-wheel at a right angle to its axle. Fig. 5 is a vertical longitudinal section inside of the driving-wheel, illustrating the vibrating adjustable sector-plates and adjustable axle-boxes. Fig. 6 is a partial duplication of Fig. 5, illustrating by red and black lines the change of pinions by sliding the master-wheel axle-boxes. Fig. 7 is a section of the main ground and driving wheel cut parallel to its axle. Fig. 8 is a perspective view of the front connecting-bar of the frame. Fig. 9 is a transverse vertical section on the line *x x* of Fig. 4. Fig. 10 are top and bottom views, in perspective, of the rear portion of the tongue and its retaining-stirrup. Fig. 11 is an elevation of the side of the rake arch or guide and balance-lever. Fig. 12 is an elevation and vertical section of the grain-wheel.

The object of my improvements as claimed in this patent is to enable the driver (where the grain is too thin to form a sheaf or gavel with a single revolution of the ground-wheel) to stop the automatic rake and hold it out of the way of the falling grain until sufficient has accumulated on the platform to make a sheaf, and then to start the rake and rake it off and stop the rake again without leaving his seat or stopping the machine.

That end of the finger-bar, cutter-bar, platform, and automatic rake which is at the right when standing behind the machine I call the "inner" ends, and those at the left "outer" ends.

The tongue, main frame, main ground and driving wheel, cutting apparatus, driving mechanism, divider, grain-wheel, and driver's seat may be made and connected as shown in the drawings.

The inner end of the finger-bar G′ is fastened to the under side of the main frame, and the platform $B^2$ is arranged directly behind the finger-bar G, and its outer end is made wider than the inner end, and the rear end of the divider I is curved inward to about correspond with the sweep of the end of the rake F.

The rake arch or guide K is made in the form shown in Fig. 11 and fastened to the finger-bar and platform. This rake-guide is curved, as shown in Fig. 1, to correspond with the sweep of the rake-teeth $f^2$. The forward part of the guide K is parallel with the platform, and its rear part rises in the arc of a circle to lift the rake as the gavel falls from the platform.

The rake F is hinged at $i^4$, with a kind of universal joint, to the bar $A^2$ of the main frame, so as to be rocked freely by the pitman *m*, which operates it. The pitman *m* is inserted in a mortise in the rake and fastened by the pin $c^2$, so as to vibrate horizontally, while it rocks the rake and vibrates the teeth slightly. The pitman *m* connects the rake to the crank *l*, which is fitted to turn freely on the ground-wheel shaft D, and is provided with a score, which embraces the clutch-pin *x* in the outer end of the shaft D and locks the crank *l* to the shaft, as shown in Fig. 1. This crank *l* is pressed against the clutch-pin by the coiled spring arranged on the shaft D between the box *g* and the crank. The hub of the crank *l* has a groove around it for the shipper-lever P, which vibrates on a stud fastened to the bar A of the main frame, so that the driver, on the seat L, can push the lever with his foot and draw the crank from its clutch-pin and stop the rake at pleasure, and withdraw his foot and let the coiled spring press the crank onto the clutch-pin and start the rake again.

To lift the rake up over the cut and falling grain as it is brought forward, I make a lever, P, Figs. 4 and 5, with a fork at one end and weight at the other, and hang it on a pin in the guide K, so as to vibrate freely, the weight P′ holding the fork up when it is released by the rake. The vibrations of the lever P are checked by the stop X on the guide K.

From the above description it will be apparent that while the crank *l* remains locked to its shaft the rake will sweep the platform at every revolution of the ground-wheel, and consequently the gavels will only contain the grain gathered at one revolution of the ground-wheel, which is all right when the grain is large and thick enough to make a sheaf with a single revolution of the ground-wheel; but if the grain is light and thin, so as to require two or more revolutions of the ground-wheel to make a sheaf, the binders would have to carry one gavel to another and put two together to make a sheaf; but with the improvements described the driver can stop the rake while the ground-wheel makes one-half, or a whole, or two or more revolutions, and allow grain enough to accumulate on the platform for a sheaf, and then rake it off, and thus save the binders the additional labor of carrying one gavel to another and putting two together to make a sheaf, for when the rake has swept a gavel from the platform and is on the rear part of its guide the driver pushes the lever P with his foot and draws the crank from its clutch-pin and stops the rake, which rests on its guide, out of the way of the falling grain, until grain enough has been gathered on the platform to make a sheaf, when the driver starts the rake, which depressed the lever P as it moved backward and passed over the short prong of the lever, which lever lifts the rake up above the falling grain as it is carried forward, and the teeth of the rake drop into the butts of the grain behind the cutter-bar and sweep the gavel sidewise and backward off of the platform out of the path of the team in cutting the next swath. As the rake was carried forward it passed out of the lever P, when it fell into the butts of the grain, and the weight P′ raised the lever ready to be depressed again as the rake passes back in raking the gavel from the platform.

I believe I have described and represented my improvements in harvesters, so as to enable any person skilled in the art to make and use them without further invention or experiment. I will now state what I desire to secure by Letters Patent, to wit:

In combination with a harvester's platform which is behind its cutting apparatus, an automatic rake having its outer end moved faster over said platform than its inner by a crank and pitman, providing said crank with suitable mechanism, so that the driver, on his seat, can lock the crank to or release it from its shaft or driving mechanism, so as to make the rake remove the gavels from the platform more or less often while the machine is in motion, and make the gavels a proper size for binding into sheaves where the grain is thin on the ground.

WM. N. WHITELEY, JR.

Witnesses:

DANL. ROWLAND,

J. D. BLOOR.